June 25, 1957 — A. L. HUBBARD — 2,796,716
COTTON PICKING AUGER

Filed March 15, 1954 — 3 Sheets-Sheet 1

INVENTOR.
A. L. HUBBARD

ATTORNEYS

June 25, 1957     A. L. HUBBARD     2,796,716
COTTON PICKING AUGER
Filed March 15, 1954     3 Sheets-Sheet 2
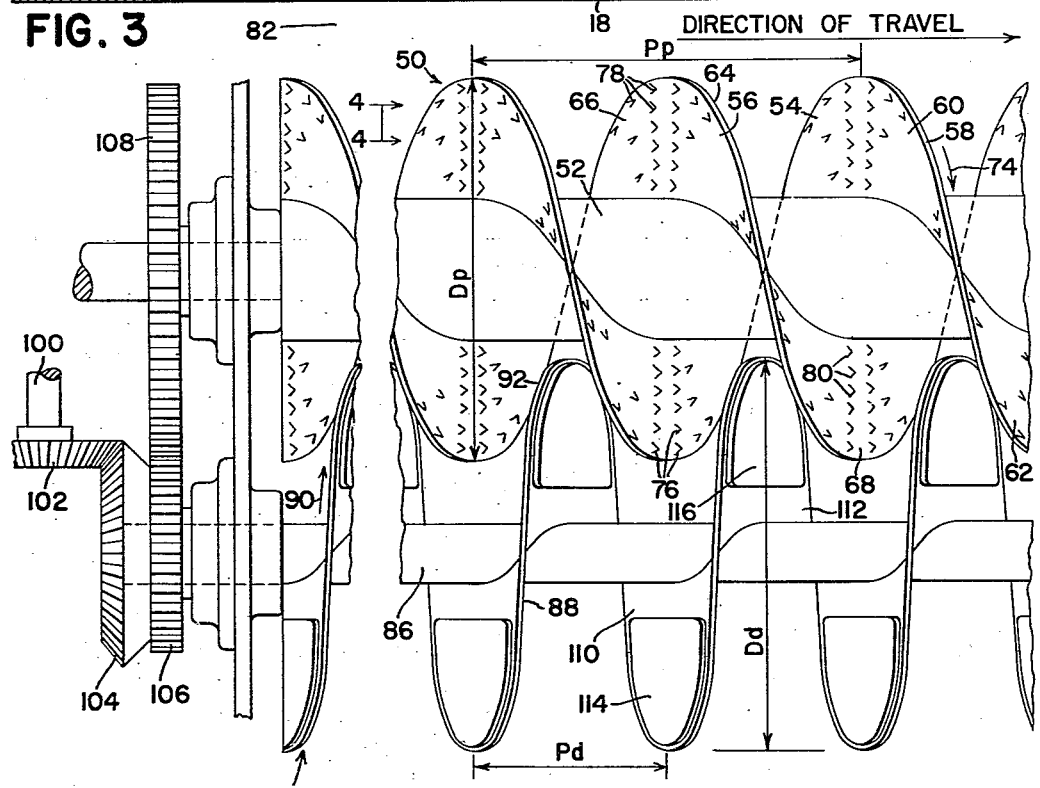
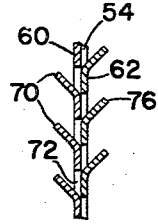
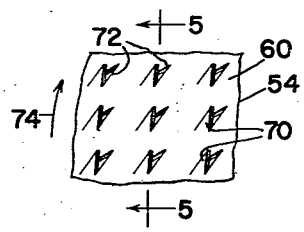
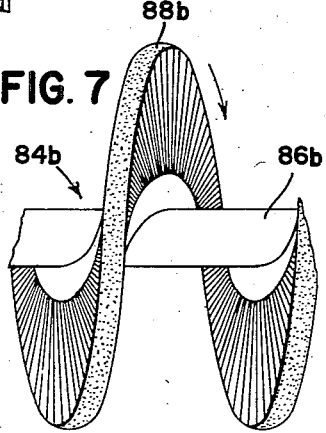
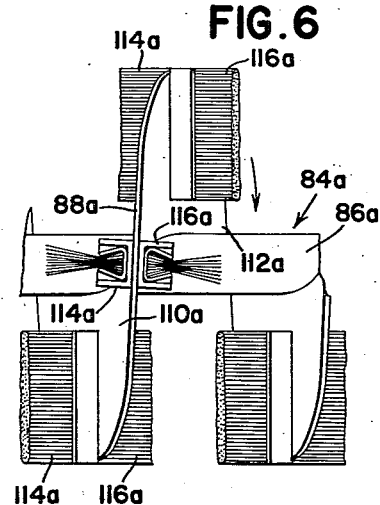
INVENTOR.
A. L. HUBBARD
ATTORNEYS June 25, 1957        A. L. HUBBARD        2,796,716

COTTON PICKING AUGER

Filed March 15, 1954        3 Sheets-Sheet 3

INVENTOR.
A. L. HUBBARD
BY
ATTORNEYS

United States Patent Office 2,796,716
Patented June 25, 1957

2,796,716
COTTON PICKING AUGER

Arthur L. Hubbard, Madrid, Iowa, assignor to Deere Manufacturing Co., Dubuque, Iowa, a corporation of Iowa Application March 15, 1954, Serial No. 416,015

9 Claims. (Cl. 56—50)

This invention relates to a harvester and more particularly to a machine for harvesting cotton. Still more particularly the invention pertains to a machine for picking cotton as distinguished from a machine for stripping cotton.

Most of the well known commercially successful cotton-picking machines are relatively complicated and expensive and depend upon the system that utilizes the projection of rotating spindles into the cotton plants as the machine advances over the field. After the spindles accumulate cotton, they are retracted and subjected to the action of doffing means. The spindles are individually driven and occur in such large numbers and must be manufactured with such comparative precision as to require that such machines can be profitably sold only at relatively high prices. The cost of maintenance and repair is of course proportional.

The principal object of the present invention is to provide a simplified cotton-picking machine involving relatively few parts that may be mass produced at low cost. Primarily, the invention features the use of a barbed or toothed auger, the barbs or teeth being formed on the helical or radial faces of the auger flight. Another feature of the invention is the utilization of a second auger as means for doffing the picked cotton from the teeth of the picking auger. Another object of the invention is to construct the picking auger as a multi-flighted auger having its number of flights, speed of rotation and pitch of the flights timed or related to the flight of the doffing auger so that the doffing auger is effective to doff both sides of all flights of the picking auger. The picking auger is simply constructed of sheet metal or the like having integral teeth or barbs, preferably struck up from the face of the auger, thus lending to the facility with which the picking augers may be manufactured. Because of the relatively few parts in the improved picker, the driving mechanism therefor is materially less complicated than driving mechanisms in machines of the type generally referred to above.

The foregoing and other important objects and desirable features inherent in the invention will become apparent as a detailed disclosure of several embodiments of the invention is made in the following specification and accompanying sheets of drawings, the several figures of which will be described immediately below.

Fig. 3 is a fragmentary plan view, partly in section and drawn to an enlarged scale, as seen substantially along the line 3—3 of Fig. 2, the intermediate wall of Fig. 2 having been omitted in the interests of clarity.

Fig. 4 is an enlarged fragmentary view of a portion of the picking auger, as seen along the line 4—4 of Fig. 3.

Fig. 5 is a sectional view, as seen along the line 5—5 of Fig. 4.

Fig. 6 is a fragmentary elevational view of a modified form of doffing auger.

Fig. 7 is a fragmentary elevational view of another modified form of doffing auger.

Figure 1:
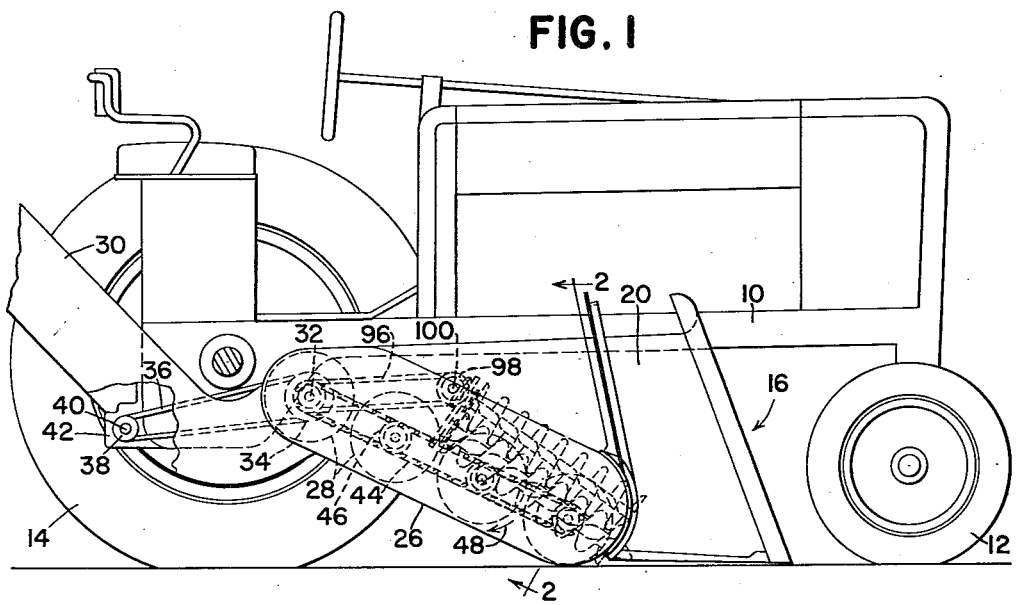
Fig. 1 is a side elevational view of the improved picker with parts broken away and shown in section.

The cotton picker chosen for the purposes of illustration (Fig. 1) is self-propelled, which characteristic is imparted to it by the use of a tractor of conventional construction having a longitudinal main body 10 carried on front and rear wheels 12 and 14 and serving as a mobile frame adapted to advance over a field of ground-borne cotton containing ripened bolls.

A harvesting unit, designated generally by the numeral 16, is appropriately mounted on the tractor and in many respects is similar to the machine shown in U. S. Patent No. 2,533,510; although, the machine may obviously take other forms.

The harvesting unit 16 is in the nature of a housing, open at its front and having laterally spaced apart, fore-and-aft extending upright inner and outer walls 18 and 20, and a shield 118 extends downwardly and inwardly from the upper portion of the wall 20 to cooperate with the wall 18 to define a throat or plant-receiving zone 22. The lower portion of the outer wall 20 terminates at 24 (Fig. 2) to establish communication between the lower portion of the zone 22 and a conveyor housing 26 alongside the unit 16. Several cotton-moving beaters 28 are rotatably carried in the housing 26 in longitudinally spaced relationship on parallel axes for advancing picked cotton rearwardly to a wagon elevator 30 for ultimate discharge to a wagon or trailer (not shown) towed by the tractor.

The uppermost beater 28 is carried on an input shaft 32 which has at its inner end an input sheave 34. A belt 36 is trained about the sheave 34 and about an output sheave or member 38 driven by suitable drive mechanism on the tractor. This mechanism has not been shown in detail, since it may take many forms and it does not per se affect the invention one way or another. Fig. 1 illustrates that the output sheave 38 is carried on a shaft 40 which projects transversely from a housing 42 carried at the rear of the tractor in such position as to derive power from the conventional power take-off shaft (not shown). The proximate ends of the beater shafts are suitably interconnected by chains and sprockets 44 and 46 so that the beaters rotate in unison in the direction of the arrow 48 (Fig. 1).

A picking auger 50 is journaled on the supporting frame, specifically by being carried in the harvesting unit 16 between the harvesting unit walls 18 and 20. The auger 50 has an elongated central shaft means 52 and is arranged so that the axis of the shaft means lies in an upright fore-and-aft extending plane. In the particular instance shown, the axis of the auger 50 is inclined upwardly and rearwardly, from which it follows that its lower or forward end is relatively close to the ground and its rearward or upper end is spaced more distantly above the ground, thus enabling the auger to accommodate cotton growing at different heights.

The auger 50 has a plurality of flights, here designated as first and second flights 54 and 56. These flights are of uniform diameter and are wound and interspaced on uniform and parallel helices. The pitch of the flight 54 is designated by the dimension $P_p$ and the pitch of the flight 56 (not specifically designated) is of course identical to that of the flight 54.

The flight 54 has an outer edge or periphery 58 and opposite generally radial helical faces 60 and 62. The flight 56 is identical and has an outer edge or periphery 64 and opposite generally radial helical faces 66 and 68.

The face 60 of the auger flight 54 is provided with a plurality of barbs or teeth 70, the details of which are best shown in Fig. 4, from which figure it will be seen that the teeth or barbs are in the form of integral tangs struck up or otherwise formed from the material of which the face of the auger is constructed, in this case sheet metal. When the tangs or barbs are struck up they leave, of course, triangular openings or apertures as at 72. The teeth are preferably arranged in helical rows and point in the direction of rotation of the auger, which direction is designated by the arrow 74 in Figs. 2, 3 and 4. Identical teeth are formed in an identical manner on the opposite face 62 of the flight 54, as indicated generally by the numeral 76. Identical teeth 78 and 80 are formed respectively on the faces 66 and 68 of the auger flight 56.

The auger 50 is arranged in the plant-receiving zone 22 and lies in relatively closely spaced relation to the inner harvesting unit wall 18, which wall comprises fore-and-aft extending means on the mobile frame alongside the auger and spaced from the peripheries of the auger flights 54 and 56 to define a fore-and-aft extending passageway 82 into which plants are guided and received as the machine advances. As the auger rotates in the direction of the arrow 74 previously described, the teeth move in an upward and then outward direction to pick the cotton from the ripened bolls and to carry the cotton generally in the direction of the conveying housing 26 in which the beaters operate to move the picked and removed cotton rearwardly to the wagon elevator 30 as described above.

Figure 2:
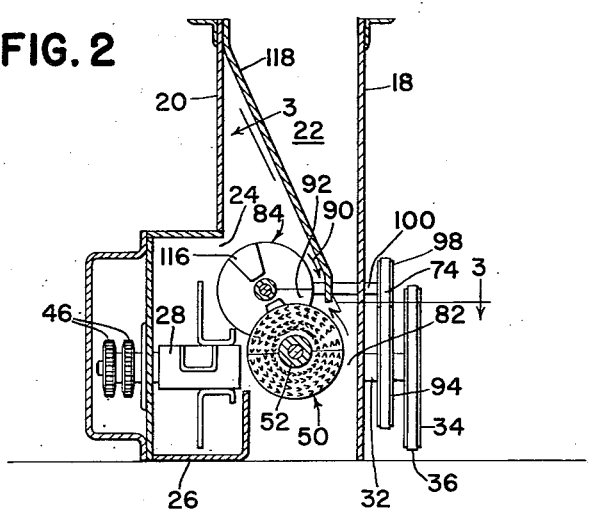
Fig. 2 is a transverse sectional view, on an enlarged scale, as seen substantially along the line 2—2 of Fig. 1.

For the purpose of removing or doffing the cotton from the teeth on the picking auger 50, the invention provides a doffing auger, designated generally by the numeral 84, which comprises elongated central shaft means 86 on which is carried a helical flight 88. The doffing auger 84 is arranged with its axis parallel to that of the picking member 50 and, as shown in Fig. 2, the augers are offset vertically and laterally so that the doffing auger is slightly above and to the right (as viewed from behind the machine and looking forwardly) of the auger 50. The doffing auger rotates in the direction of the arrow 90 and the two augers are intermeshed so that radially outermost portions of the flight 88 of the doffing auger 84 run between portions of the flights 54 and 56 of the picking auger 50, the two augers thus overlapping in what may be termed a doffing zone designated generally by the numeral 92. The pitch of the flight 88 on the doffing auger is uniform and in the particular instance shown, as designated by the dimension $P_d$, is one half the pitch $P_p$ of the picking auger 50. The diameter of the picker auger 50 is represented as $D_p$ and that of the doffing auger 84 as $D_d$. In Figs. 1–8, $D_p=D_d$. Another factor taken into consideration in the construction and arrangement of the two augers is the speed of one relative to the speed of the other.

As best shown in Figs. 1 and 3, the augers are connected by drive means that in turn is ultimately connected to the output member 38 of the drive mechanism on the tractor, as described above. The intermediate portion of this drive means comprises a second sheave 94 keyed to the inner end of the upper beater shaft 32 (Fig. 2). A belt 96 is trained about the sheave 94 and about a forwardly mounted sheave 98 on a transverse auger input shaft 100, and a bevel pinion 102 on the auger input shaft meshes with a bevel pinion 104 on the rear or upper end of the doffing auger shaft means 86. A spur gear 106 on the doffing auger shaft means 86 is in constant mesh with a larger spur gear 108 on the upper end of the picking auger shaft means 52. The spur gear 108 is twice as large as the spur gear 106 so that the speed of the picking auger 50 is one half the speed of the doffing auger 84. Stated otherwise, the ratio of the pitch $P_p$ of the flight 54 (or flight 56) of the picking auger 50 to the pitch $P_d$ of the doffing auger 84 is two to one; likewise, the speed of rotation of the doffing auger 84 (which may be represented as $S_d$) to the speed of rotation of the picking auger 50 (which may be represented as $S_p$) is two to one; and the ratio of the number of flights 54 and 56 on the picking auger 50 to the number of flights on the doffing auger 84 is also two to one. Stated in formula fashion $P_p \times S_p = P_d \times S_d$ where:

$P_p$=flight pitch of the picking auger 50
$P_d$=flight pitch of the doffing auger 84
$S_p$=R. P. M. of picking auger 50
$S_d$=R. P. M. of doffing auger 84

Hence, these various ratios are equal and, as will be obvious, the relative speeds, pitches and number of flights on the picking auger could be varied from those shown merely by expanding what is disclosed here, bearing in mind that the essential requirement is that the two augers be so related that the doffing auger flight has a higher surface speed than that of the picker auger flight.

The doffing auger flight 88 has opposite generally radial faces 110 and 112 and each of these faces carries doffing means for operating in wiping engagement with the cotton carried by the teeth of the associated picking auger portion. In Figs. 2 and 3, the doffing means in each case is in the form of a doffing element or pad 114 of resilient material on the face 110 and an identical pad 116 on the face 112. These pads or elements are arranged in circumferentially or helically spaced relation, here 180° apart; although the angular or helical spacing could be varied to suit invidual desires.

The shield or intermediate wall 118 runs lengthwise of the doffing auger (Fig. 2) and appropriately shields this auger from plants in the passageway 82.

In Fig. 6 is shown a modified doffing auger designated generally by the numeral 84a, which has a central shaft means 86a and a helical flight 88a, this flight having opposite helical faces 110a and 112a. The doffing elements in this form of doffer are in the form of grouped bristles designated generally by 114a and 116a. These groups of bristles, like the pads 114 and 116 in Figs. 2 and 3, are spaced apart helically, except that in Fig. 6 the helical spacing is on the order of 90° rather than 180°; although, as indicated above, this spacing can be varied within the scope of the invention. The construction of the bristle groups 114a and 116a is believed to be clear without further description.

In the doffing auger of Fig. 7, designated generally by the numeral 84b and having a shaft 86b and flight 88b, the flight itself includes the doffing means, the axial thickness of the flight being substantially equal to the combined thickness of the opposed pads 114 and 116 plus the thickness of the intervening flight 88 in the doffing auger 84. The flight 88b, as will be obvious, is itself constructed wholly of bristles.

The doffers shown may be used interchangeably with the picking auger 50, and in the operation of a machine equipped as suggested, the machine is driven over the field in the usual manner and the ground-borne cotton plants, being planted in rows, are received, as the machine is guided along each row, in the plant-receiving zone 22, the cotton-bearing portion of the plant being compressed between the inner wall 18 and the picking auger 50. Because of the interspacing between the flights 54 and 56 on the picking auger 50, there is substantial room in the picking passage 82 to accommodate the plants without injury thereto and as the auger 50 rotates upwardly adjacent the wall 18, the teeth on the auger will pick the cotton from the open bolls and will transfer it through the doffing zone, the doffing auger rotating at the same time and its pads 114 and 116 (or bristle groups 114a and 116a or bristled flight 88b) passing through this zone at a greater circumferential speed so as to wipe or doff the cotton from the auger teeth and transfer the cotton to the conveying means comprising the rotary beaters in the housing 26.

Figure 8:
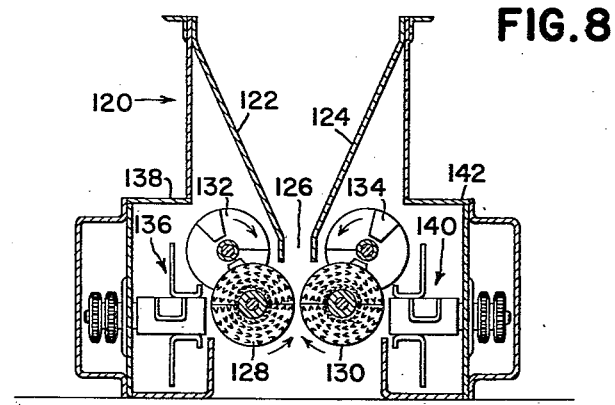
Fig. 8 is a sectional view like Fig. 2 but showing another form of the invention in which a double arrangement of picking and doffing auger is used.

That form of the invention shown in Fig. 8 represents substantially a duplication of that shown in Fig. 2 and therefore need be only generally described. In the Fig. 8 form, the housing is represented generally by the numeral 120 and includes a pair of inner downwardly tapering walls 122 and 124 that define a narrow plant-receiving passageway 126. At one side of this passageway is a picking auger 128 and at the other side is a similar picking auger 130, these augers rotating respectively in opposite directions as indicated by the arrows. Doffers 132 and 134 are associated respectively with the picking augers 128 and 130. Each picking auger may in detail be exactly like the picking auger 50 of Figs. 2 and 3; although, the teeth on the auger 130 point in the opposite direction because of the opposite direction of rotation. The doffing augers 132 and 134 are duplicates of the doffing auger 84 of Figs. 2 and 3; although, each of these augers could as well include the modified structures of Figs. 6 and 7. The cooperating augers 128 and 132 deliver picked and doffed cotton to conveying means 136 contained in an outer housing portion 138. Similar conveying means 140 is located to receive picked and doffed cotton from the cooperating augers 130 and 134, this conveying means being enclosed in a symmetrical housing portion 142. Since the details of the construction will be obvious from that previously described in connection with Figs. 1, 2 and 3, repetition is deemed to be unnecessary.

Figure 9:
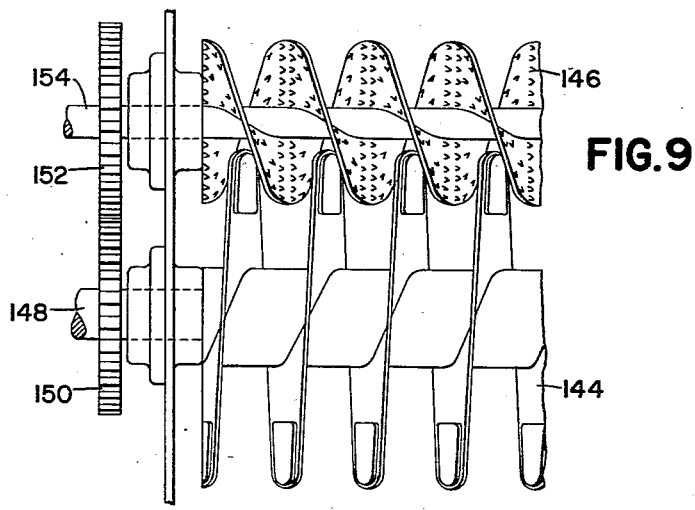
Fig. 9 is a partial plan view illustrating a further modification based on picking and doffing augers of the same flight pitch but of different diameters.

In those forms of the invention previously described, the picking and doffing augers have the same pitch and diameter but the R. P. M. of each differs from that of the other, which is necessary in those instances to accomplish the excess in surface speed of the doffing auger over that of the picking auger. In Fig. 9, increased surface speed of a doffing auger 144 over that of a picking auger 146 is accomplished by a relationship between the two in which the diameter of the doffing auger is larger than that of the picking auger. Apart from this, the details may be the same as those previously disclosed. That is to say, the picking auger 146 may be in all respects similar to the previously described picking auger 50 and the doffing auger 144, although shown as embodying the features of the doffing auger 84 of Fig. 3 may as well embody the features of the doffing augers shown in Figs. 6 and 7.

The doffing auger 144 is carried on a shaft 148 on which is keyed a drive gear 150 in constant mesh with a drive gear 152 keyed to a picking auger shaft 154. The gears 150 and 152 are of the same size so that the two augers are driven in opposite directions but at the same R. P. M. However, as already indicated, the increase in surface speed of the doffing auger 144 is accomplished by its increased diameter over that of the picking auger. The pitch of the doffing auger equals the pitch of the picking auger.

Figure 10:
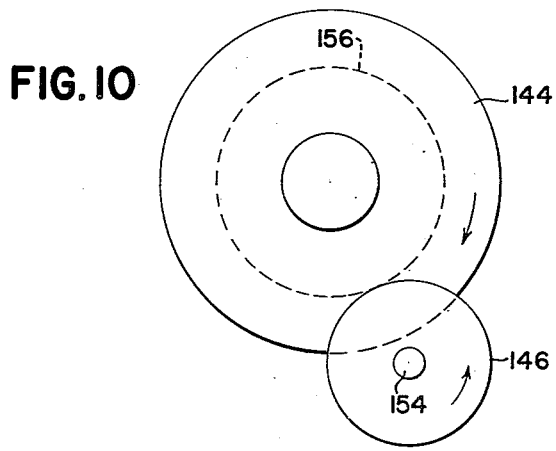
Fig. 10 is an end view of the Fig. 9 arrangement.

In the schematic illustration in Fig. 10, the dotted circle 156 represents an imaginary circle tangent to the circle representing the periphery of the picking auger 146. It is necessary that the diameter of the circle 156 be greater than the diameter of the circle representing the perimeter of the picking auger 144. By this means is achieved the essential requirement that the two augers be so related that the doffing flight has a higher surface speed than the picking auger flight and this excess of surface speed prevails over the entire zone of the overlap of the auger flights, even at the point nearest the axis of the doffing auger.

In further explanation of what is involved here, it is possible to accomplish the results of Figs. 1 through 3, for example, by using augers in which each has a single flight. It is possible in Fig. 3, for example, to use double flighting because the pitch of the doffing auger flight is exactly half that of the pitch of the picking auger flight. If the pitch on the doffing auger were exactly one-third of that of the picking auger and the speed of the doffing auger were three times that of the picking auger, one could employ either the single flighting on the picking auger or a triple flighting on the picking auger or in fact just two flights on the picking auger, provided that the spacing were the same as a triple flighting with one flighting removed.

As will be seen, the picking auger 50, and any one of the doffing augers 84, 84a and 84b, may be simple constructed without precision equipment. They are relatively inexpensive and operate efficiently. Hence, a machine embodying the designs of this invention may be a low-cost and inexpensively maintained machine.

Various other features of the invention not specifically enumerated herein will undoubtedly occur to those versed in the art, as will numerous modifications and alterations in the preferred embodiments of the invention disclosed, all of which may be achieved without departing from the spirit and scope of the invention.

What is claimed is:

1. A cotton-picking machine comprising: a mobile frame adapted to advance over a field of ground-borne cotton containing ripened bolls; drive mechanism on the frame, including an output member; a cotton picker auger having an elongated central shaft means journaled on the frame with its axis lying in an upright fore-and-aft plane and a helical flight carried by the central shaft means, said flight having opposite generally radial helical faces and a helical periphery, and at least one of said faces having picking teeth thereon throughout the length of the flight; fore-and-after means on the frame alongside the auger and spaced from the periphery of the auger flight and cooperating with the auger to define a fore-and-aft extending passageway into which plants are guided and received as the machine advances; drive means connecting the auger to the drive mechanism output member for rotating the auger so that the auger teeth pick cotton from ripened bolls received in the passageway; and means carried by the frame and cooperative with the auger for doffing cotton from the auger teeth.

2. The invention defined in claim 1, in which: both faces of the picking auger have picking teeth thereon.

3. The invention defined in claim 1, in which: the picking auger has on its shaft means a second helical flight interspaced with the first flight on a helix parallel to that of the first flight, said second flight has opposite generally radial leading and trailing helical faces, and at least one face of the second flight has picking teeth thereon.

4. A cotton-picking auger of the class described, comprising: an elongated shaft means and a helical flight carried thereon, said flight having opposite generally radial helical faces, and at least one of said faces having picking teeth thereon.

5. The invention defined in claim 4, in which: both faces of the flight have picking teeth thereon.

6. The invention defined in claim 4, in which: the teeth are integral with the face and comprise portions of the face material displaced from said face material.

7. The invention defined in claim 4, in which: the teeth are arranged in helical rows homocentric with the helix of the flight and point generally in the direction of said flight helix.

8. A cotton-picking auger of the class described, comprising: an elongated shaft means and a plurality of interspaced substantially identical helical flights thereon, each flight having opposite generally radial helical faces, and at least one face of each flight having picking teeth thereon.

9. The invention defined in claim 8, in which: both faces of each flight have picking teeth thereon.

(References on following page)

References Cited in the file of this patent

UNITED STATES PATENTS

| | | |
|---|---|---|
| 364,607 | Spangenberg | June 7, 1887 |
| 703,916 | Haley | July 1, 1902 |
| 790,834 | Harvey | May 23, 1905 |
| 1,950,902 | Morse | Mar. 13, 1934 |
| 1,978,888 | Thomann | Oct. 30, 1934 |
| 2,247,682 | Hagen | July 1, 1941 |
| 2,451,130 | Townsend | Oct. 12, 1948 |
| 2,475,531 | Townsend | July 5, 1949 |
| 2,503,128 | Neighbour et al. | Apr. 4, 1950 |
| 2,571,224 | Edwards | Oct. 16, 1951 |
| 2,619,784 | Paradise | Dec. 2, 1952 |
| 2,635,407 | Pruser | Apr. 21, 1953 |
| 2,660,849 | Knowles | Dec. 1, 1953 |